(12) United States Patent
Ji et al.

(10) Patent No.: US 11,846,922 B2
(45) Date of Patent: Dec. 19, 2023

(54) METHOD AND SYSTEM FOR CLEARING REGISTER BY PLD, DEVICE, AND MEDIUM

(71) Applicant: INSPUR SUZHOU INTELLIGENT TECHNOLOGY CO., LTD., Jiangsu (CN)

(72) Inventors: Dongdong Ji, Jiangsu (CN); Guangle Zhang, Jiangsu (CN); Yuejun Guo, Jiangsu (CN)

(73) Assignee: INSPUR SUZHOU INTELLIGENT TECHNOLOGY CO., LTD., Jiangsu (CN)

(*) Notice: Subject to any disclaimer, the term of this patent is extended or adjusted under 35 U.S.C. 154(b) by 0 days.

(21) Appl. No.: 18/036,597

(22) PCT Filed: Sep. 30, 2021

(86) PCT No.: PCT/CN2021/122286
§ 371 (c)(1),
(2) Date: May 11, 2023

(87) PCT Pub. No.: WO2022/127301
PCT Pub. Date: Jun. 23, 2022

(65) Prior Publication Data
US 2023/0324865 A1 Oct. 12, 2023

(30) Foreign Application Priority Data
Dec. 18, 2020 (CN) .......................... 202011506369.1

(51) Int. Cl.
*G05B 19/042* (2006.01)
*G05B 19/05* (2006.01)
(Continued)

(52) U.S. Cl.
CPC .......... *G05B 19/042* (2013.01); *G05B 19/05* (2013.01); *G06F 9/30145* (2013.01); *G06F 15/7867* (2013.01)

(58) Field of Classification Search
None
See application file for complete search history.

(56) References Cited

U.S. PATENT DOCUMENTS 5,970,254 A * 10/1999 Cooke ................ G06F 15/7867
   712/1
9,002,525 B2 * 4/2015 Gourlay ................ G05B 15/02
   165/203
(Continued)

FOREIGN PATENT DOCUMENTS

CN       101158859 A    4/2008
CN       101954798 A    1/2011
(Continued)

OTHER PUBLICATIONS

Machine Translation of Chinese Patent Application CN 110271009 A, 2019. (Year: 2019).*

(Continued)

*Primary Examiner* — Steven G Snyder
(74) *Attorney, Agent, or Firm* — IPro, PLLC (57) ABSTRACT

A method for clearing a register, including: causing the PLD to set preset bits of a first register and a second register as an invalid state, detect whether a command is received from a MCU; when the command being received, parsing the command and determining whether a reading or writing event is triggered; when the reading event being triggered, setting the preset bit of the first register as a valid state, reading data of the preset bit of the first register, postponing clearing, by the PLD, the preset bit of the first register for a preset time; when the writing event being triggered, setting the preset bit of the second register as the valid state, writing, by the MCU, data into the preset bit of the second register, causing the PLD to acquire the data, postpone clearing the preset bit of the second register for a second preset time.

20 Claims, 4 Drawing Sheets

(51) Int. Cl.
     *G06F 9/30*           (2018.01)
     *G06F 15/78*         (2006.01)

(56) References Cited

U.S. PATENT DOCUMENTS

| | | | | |
|---|---|---|---|---|
| 10,203,884 B2* | 2/2019 | Madraswala | ........ | G11C 16/225 |
| 11,402,996 B2* | 8/2022 | Madraswala | ........ | G06F 3/0613 |
| 2017/0285969 A1* | 10/2017 | Madraswala | ........ | G06F 3/0659 |
| 2019/0278488 A1* | 9/2019 | Madraswala | ........ | G06F 3/0679 |

FOREIGN PATENT DOCUMENTS

| | | |
|---|---|---|
| CN | 110098965 A | 8/2019 |
| CN | 111488297 A | 8/2020 |
| CN | 112612520 A | 4/2021 |
| WO | WO-2021098788 A1 * | 5/2021 |

OTHER PUBLICATIONS

Machine Translation of Chinese Patent Application CN 101576818 A, 2009. (Year: 2009).*
Machine Translation of Chinese Patent Application CN 104407279 A, 2015. (Year: 2015).*

* cited by examiner

METHOD AND SYSTEM FOR CLEARING REGISTER BY PLD, DEVICE, AND MEDIUM

CROSS-REFERENCE TO RELATED APPLICATION

The present disclosure claims priority to Chinese patent application No. 202011506369.1, titled "METHOD AND SYSTEM FOR CLEARING REGISTER BASED ON PROGRAMMABLE LOGIC DEVICE, DEVICE, AND MEDIUM" filed on Dec. 18, 2020 before the CNIPA, China National Intellectual Property Administration, which is incorporated herein in its entirety by reference.

TECHNICAL FIELD

The present disclosure relates to the field of switches, and in particular to a method and a system for clearing a register based on a programmable logic device, a computer device, and a readable medium.

BACKGROUND

At present, programmable logic devices (PLDs) mainly include complex programmable logic devices (CPLDs) and field programmable gate arrays (FPGAs). A CPLD/FPGA is a semi-customized application specific integrated circuit with advantages such as flexible programming, quick response, and high integration, and is widely applied in prophase development verification and the field of control application. In a switch system, a CPLD/FPGA chip is used to control the power-on and power-off timing control, communication control, key detection, fan speed control, SFP lighting control, and serial port switching of the whole switch, and a baseboard management controller (BMC) is used to indicate states of the switch, perform status detection, firmware upgrade, remote control, voltage control, and log collection.

A microcontroller unit (MCU) is a key to the whole PLD design or the design of a switch system. It is a major part of a communication design that the MCU accesses a PLD register and communicates with the CPLD/FPGA. The design of the PLD register mainly includes a read-only register and a read-write register. The MCU reads register information to obtain information about the switch system, and the MCU writes a value into the register to control behaviors of the switch system. With regard to behaviors such as log recording or resetting an external device under the control of the MCU, after reading a log or writing a control command, the MCU needs to perform a clearing design operation so as to enable the MCU to read a next valid log or prevent the external device from always being in a reset state, which will impose a workload on the upper layer MCU. On the other hand, the MCU controls the state of the external device by issuing commands, and an interval between two commands cannot be precisely controlled.

SUMMARY

In view of the above, an object of embodiments of the present disclosure is to provide a method and a system for clearing a register based on a PLD, a computer device, and a computer-readable storage medium.

In view of the above object, an aspect of embodiments of the present disclosure provides a method for clearing a register based on a programmable logic device (PLD), including: setting, by the PLD, preset bits of a first register and a second register as an invalid state, and detecting whether a command is received from a microcontroller unit (MCU); in response to detecting that the command is received from the MCU, parsing the command and determining whether a reading event or a writing event is triggered; in response to the reading event being triggered, setting the preset bit of the first register to be a valid state, reading, by the MCU, data of the preset bit of the first register, and postponing clearing, by the PLD, the preset bit of the first register for a preset time; and in response to the writing event being triggered, setting the preset bit of the second register to be the valid state, writing, by the MCU, data into the preset bit of the second register, and causing the PLD to acquire the data, and postpone clearing the preset bit of the second register for a second preset time.

In some embodiments, the causing the PLD to acquire the data, and postpone clearing the preset bit of the second register for a second preset time includes: causing the PLD to: perform a corresponding operation on an external device according to data of the preset bit of the second register and start a timer, and clear the preset bit of the second register when the timer reaches a preset value of the external device.

In some embodiments, the postponing clearing, by the PLD, the preset bit of the first register for a preset time includes: detecting whether the MCU starts reading data of the preset bit of the first register; starting a timer in response to detecting that the MCU starts reading data of the preset bit of the first register, and detecting whether the MCU has completed reading in response to the timer reaching the preset time; and clearing the preset bit of the first register in response to detecting that the MCU has completed reading.

In some embodiments, the postponing clearing, by the PLD, the preset bit of the first register for a preset time includes: detecting, after the preset time elapsed, whether the MCU has completed reading again in response to detecting that the MCU has not completed reading.

Another aspect of embodiments of the present disclosure provides a system for clearing a register based on a programmable logic device (PLD), including: an initialization module, configured to enable the PLD to: set preset bits of a first register and a second register as an invalid state, and detect whether a command is received from an MCU; a determination module, configured to parse the command and determine whether a reading event or a writing event is triggered in response to detecting that the command is received from the MCU; a read-clearing module, configured to: in response to the reading event being triggered, set the preset bit of the first register as a valid state, read data of the preset bit of the first register by the MCU, and postpone clearing the preset bit of the first register by the PLD for a preset time; and a write-clearing module, configured to, in response to the writing event being triggered, set the preset bit of the second register as the valid state; write data into the preset bit of the second register by the MCU; cause the PLD to: acquire the data, and postpone clearing the preset bit of the second register for a second preset time.

In some embodiments, the write-clearing module is configured to cause the PLD to: perform a corresponding operation on an external device according to data of the preset bit of the second register and start a timer, and clear the preset bit of the second register when the timer reaches a preset value of the external device.

In some embodiments, the read-clearing module is configured to: detect whether the MCU starts reading data of the preset bit of the first register; start a timer in response to detecting that the MCU starts reading data of the preset bit of the first register, and detect whether the MCU has completed reading in response to the timer reaching the preset time; and clear the preset bit of the first register in response to detecting that the MCU has completed reading.

In some embodiments, the read-clearing module is configured to: detect, after the preset time elapsed, whether the MCU has completed reading again in response to detecting that the MCU has not completed reading.

Another aspect of embodiments of the present disclosure provides a computer device, including: at least one processor; and a memory storing computer-readable instructions executable on the processor that, when executed by the at least one processor, cause the at least one processor to perform the steps of the method described above.

Another aspect of embodiments of the present disclosure provides a computer-readable storage medium, wherein the computer-readable storage medium stores computer-readable instructions that, when executed by a processor, cause the processor to perform the steps of the method described above.

BRIEF DESCRIPTION OF THE DRAWINGS

To illustrate technical solutions of the present disclosure or the related art more clearly, a brief description will be given below with reference to the accompanying drawings which are used in the description of the embodiments or the related art; apparently, the drawings in the description below are only some rather than all of the embodiments of the present disclosure, and those skilled in the art may obtain other embodiments based on these drawings without paying any creative effort.

DETAILED DESCRIPTION

In order that the object, technical solutions and advantages of the present disclosure may be more clearly understood, embodiments of the present disclosure will be further described in detail, with reference to the accompanying drawings.

It should be noted that expressions "first" and "second" as used throughout the embodiments of the present disclosure are used for distinguishing two distinct entities or parameters with the same name. It can be seen that "first" and "second" are merely for the convenience of description and should not be understood as limiting the embodiments of the present disclosure, which will not be explained repeatedly in the subsequent embodiments.

Figure 1:
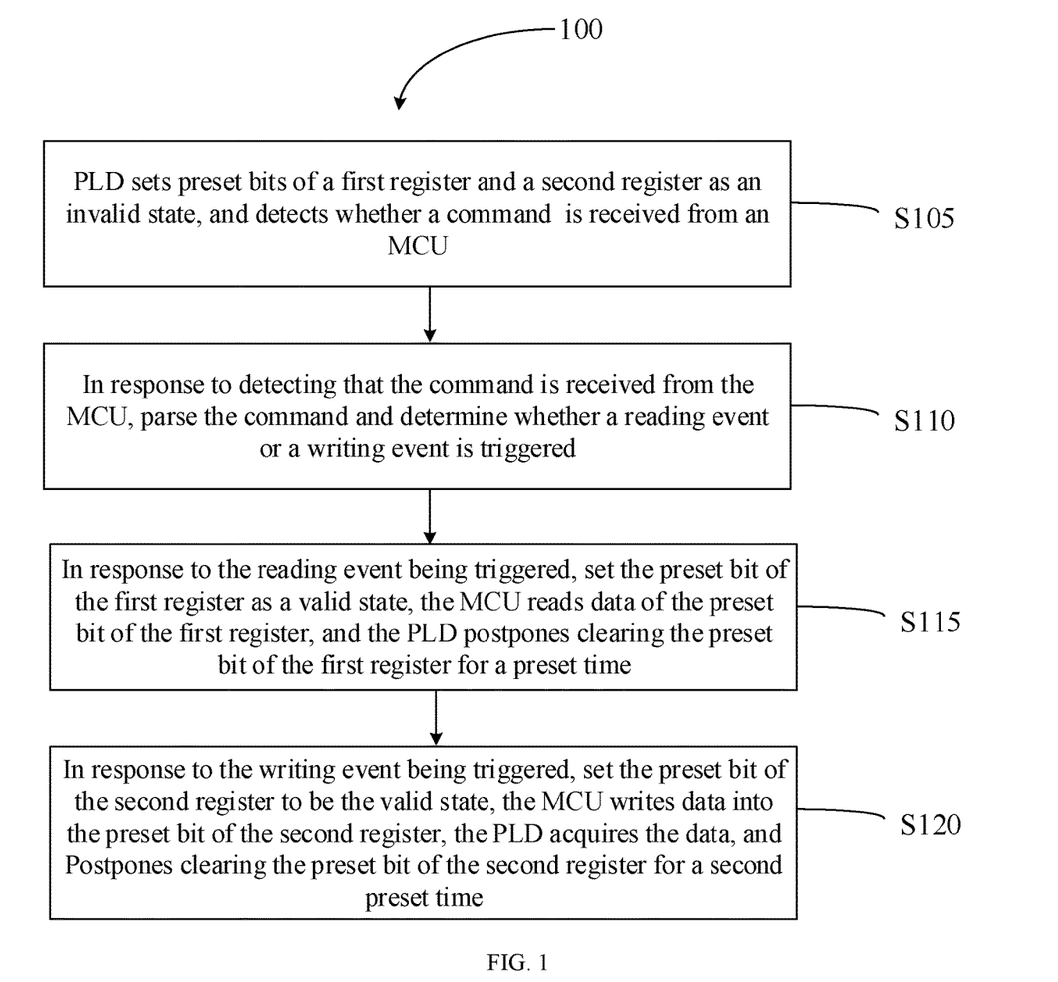
FIG. 1 is a schematic diagram illustrating an embodiment of a method for clearing a register based on a PLD provided by the present disclosure.

In view of the above object, in a first aspect of the embodiments of the present disclosure, an embodiment of a method for clearing a register based on a PLD is provided. FIG. 1 is a schematic diagram illustrating the embodiment of the method for clearing a register based on a PLD provided by the present disclosure. As shown in FIG. 1, the method 100 for clearing a register based on a PLD according to the embodiment of the present disclosure includes steps described below.

At S105, the PLD sets preset bits of a first register and a second register as an invalid state, and detects whether a command is received from an MCU.

At S110, in response to detecting that a command is received from the MCU, the command is parsed to determine whether a reading event or a writing event is triggered.

At S115, in response to a reading event being triggered, the preset bit of the first register is set as a valid state, data on the preset bit of the first register is read by the MCU, and the PLD postpones clearing the preset bit of the first register for a preset time.

At S120, in response to a writing event being triggered, the preset bit of the second register is set as a valid state, data is written into the preset bit of the second register by the MCU, the PLD acquires the data, and postpones clearing the preset bit of the second register for a second preset time.

Figure 2:
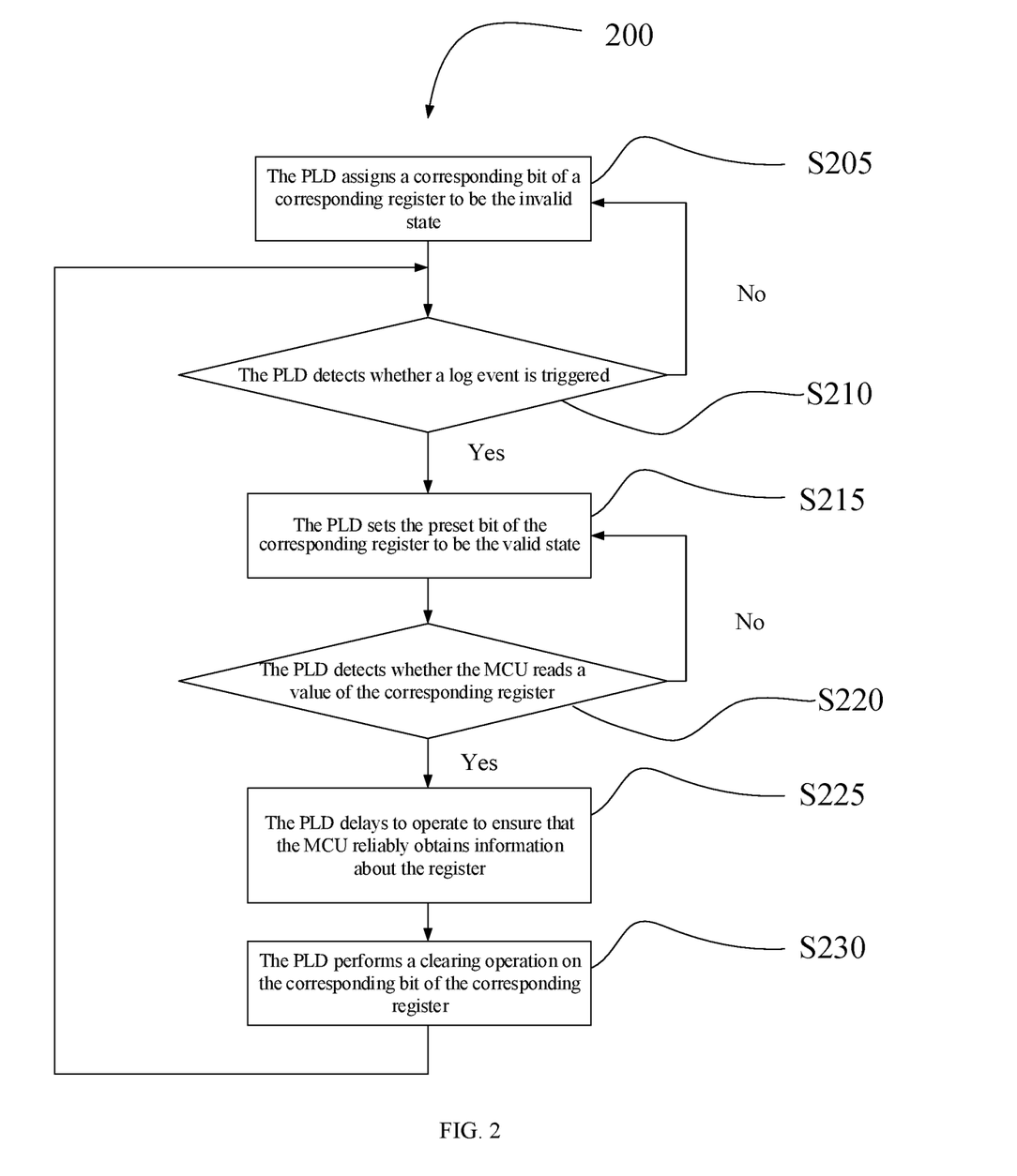
FIG. 2 is a flowchart of read-clearing of a register based on a PLD.

FIG. 2 is a flowchart of a method 200 for read-clearing of a register based on a PLD. As shown in FIG. 2, when the PLD is working, the preset bit of the first register is in the invalid state; in response to detecting that an event is triggered, the PLD sets the preset bit of the register as a valid bit; the MCU reads the information of the preset bit of the register, the PLD postpones performing a clearing operation on the preset bit of the register, and the above process is cyclically executed. In some embodiments, the first register is a read-only register for the MCU, and in addition, the first register is mainly used for recording a log event, and the read-clearing operation is to perform a reading operation on a corresponding register according to the MCU.

In some embodiments, a flow of the method 200 for read-clearing includes steps described below.

At S205, the PLD assigns a corresponding bit of a corresponding register to be the invalid state.

At S210, the PLD detects whether a log event is triggered.

At S215, the PLD sets a preset bit of the corresponding register as the valid state in response to detecting that the log event is triggered.

At S220, the PLD detects whether a value of the corresponding register is read by the MCU.

At S225, in response to detecting that the value of the corresponding register is read by the MCU, the PLD postpones operating, so as to ensure that the MCU reliably obtains information about the register.

At S230, the PLD performs a clearing operation on the corresponding bit of the corresponding register.

Figure 3:
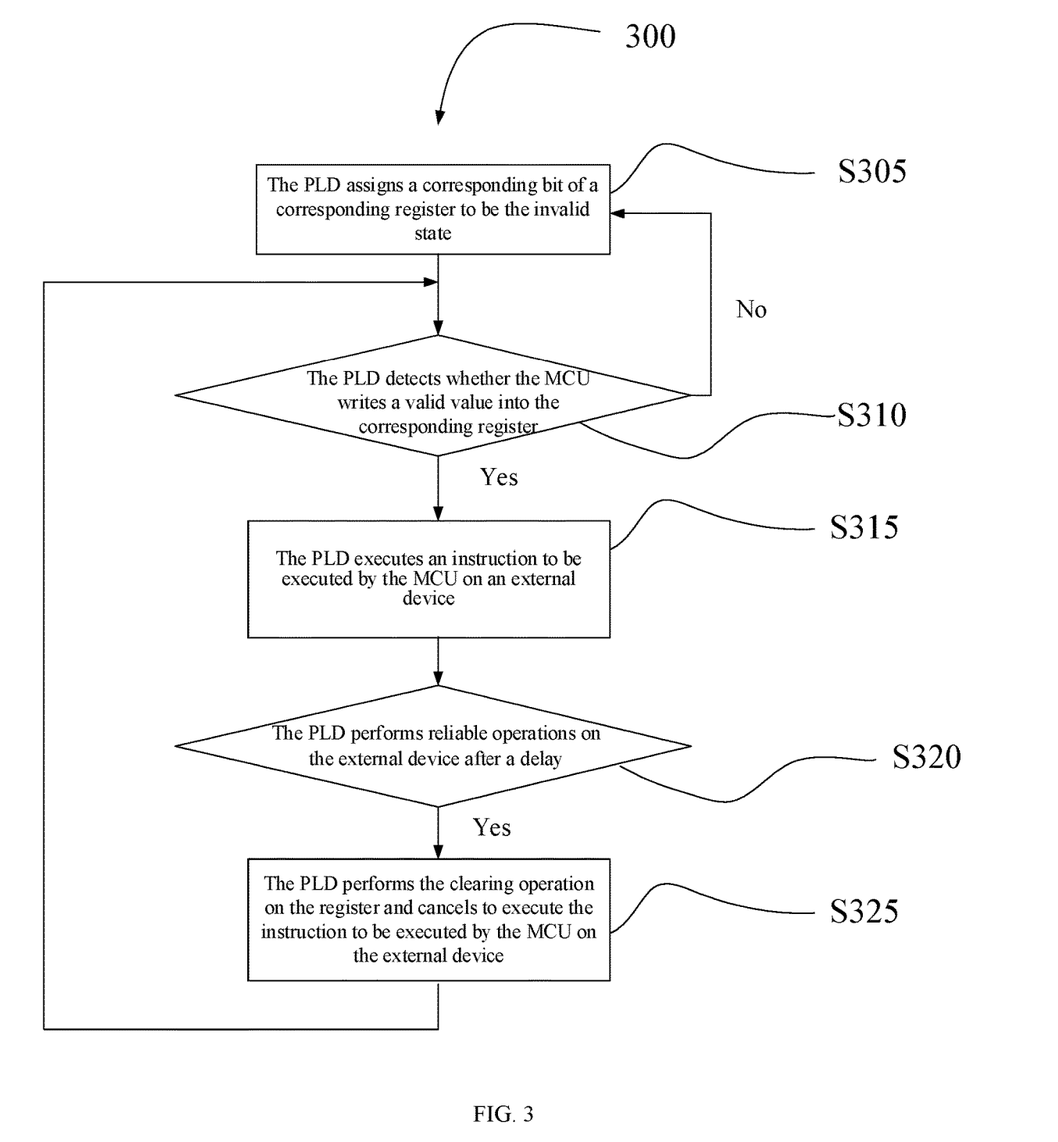
FIG. 3 is a flowchart of write-clearing of a register based on a PLD.

FIG. 3 is a flowchart of a method 300 for write-clearing of a register based on a PLD. As shown in FIG. 3, when the PLD is working, no operation is performed on an external device, that is, the preset bit of the second register is in the invalid state; when the PLD detects that valid data is written into the preset bit of the second register by the MCU, a valid operation is performed on the external device; the PLD starts a timer, and when the timer reaches a number that satisfies the requirements of the external device, a clearing operation is performed on the preset bit of the register, that is, operations on the external device are canceled. In some embodiments, the second register is a readable and writable register for the MCU; in addition, the second register is mainly used for operations such as resetting the external device, and the write-clearing operation is to write valid data to a preset bit of a corresponding register according to the MCU.

In some embodiments, a flow of the method 300 for write-clearing includes steps described below.

At S305, the PLD assigns a corresponding bit of a corresponding register to be the invalid state.

At S310, the PLD detects whether a valid value is written into the corresponding register by the MCU.

At S315, the PLD executes an instruction to be executed by the MCU on the external device in response to detecting that the valid value is written into the corresponding register by the MCU.

At S320, the PLD postpones performing a reliable operation on the external device.

At S325, until a preset time elapsed, the PLD performs a clearing operation on the register and cancels to execute the instruction to be executed by the MCU on the external device. The whole process of the clearing operation is as follows.

The PLD sets the preset bits of the first register and the second register as the invalid state and detects whether a command is received from the MCU. In response to detecting that the command is received from the MCU, the command is parsed to determine whether a reading event or a writing event is triggered.

In response to the reading event being triggered, the preset bit of the first register is set as the valid state, the MCU reads data of the preset bit of the first register, and the PLD postpones clearing the preset bit of the first register for a preset time.

In some embodiments, the PLD postpones clearing the preset bit of the first register for a preset time by: detecting whether the MCU starts reading data of the preset bit of the first register; starting a timer in response to detecting that the MCU starts reading the data of the preset bit of the first register, and detecting whether the MCU has completed reading until the timer reaches the preset time; and clearing the preset bit of the first register in response to detecting that the MCU has completed reading.

In some embodiments, the PLD postpones clearing the preset bit of the first register for a preset time by: in response to detecting that the MCU has not completed reading, detecting whether the MCU has completed reading again after the preset time elapsed.

In response to the writing event being triggered, the preset bit of the second register is set as the valid state, the MCU writes data in the preset bit of the second register, and the PLD acquires the data, and postpones clearing the preset bit of the second register for a second preset time.

In some embodiments, the PLD acquires the data, and postpones clearing the preset bit of the second register for a second preset time by causing the PLD to: perform a corresponding operation on an external device according to data of the preset bit of the second register and start a timer, and clear the preset bit of the second register when the timer reaches a preset value of the external device.

Figure 4:
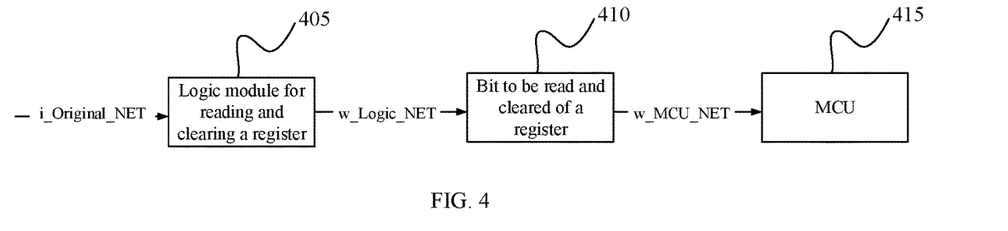
FIG. 4 is a schematic diagram illustrating a function of a first register.

FIG. 4 is a schematic diagram illustrating a function of a first register. As shown in FIG. 4, "i_Original_NET" is a device indication signal originally input to the PLD; "w_Logic_NET" is a signal determined logically by the PLD, and this signal is input to the first register; "w_MCU_NET" is information acquired from the first register by an MCU 415. With regard to the read-clearing operation 410 on the preset bit of the first register, the "logic module for reading and clearing a register 405" is a major design point, and the read-clearing flow follows the functional flow designed in FIG. 2. The preset bit of the first register is successfully set as the valid state when a valid transitioning edge happens to "i_Original_NET"; a start flag of clearing the first register with the preset bit being set as valid is that the MCU 415 performs a reading operation on the register; to ensure that MCU 415 reliably obtains information about the register, an end flag of clearing is that a specified time passed since the start flag.

Figure 5:
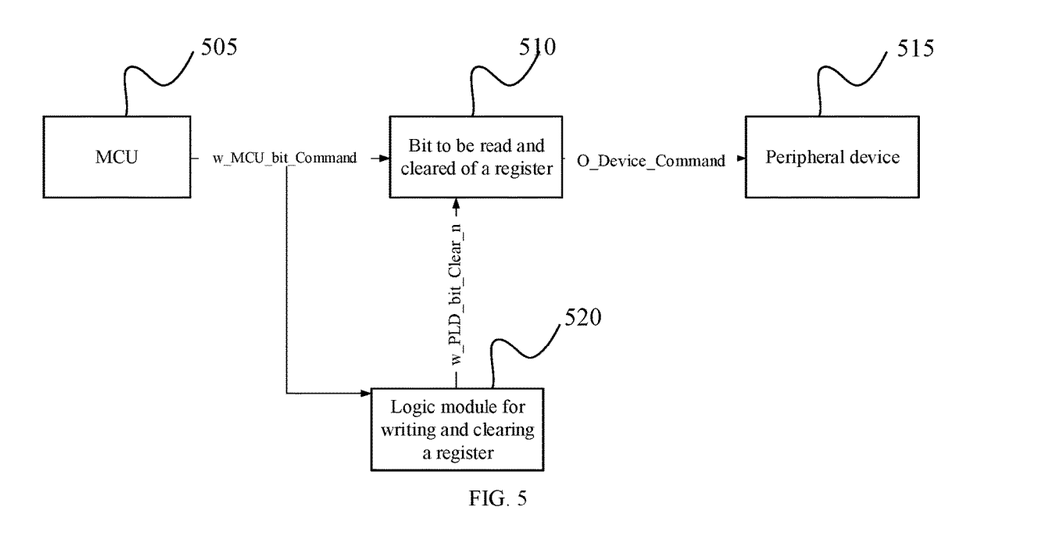
FIG. 5 is a schematic diagram illustrating a function of a second register.

FIG. 5 is a schematic diagram illustrating a function of a second register. As shown in FIG. 5, "w_MCU_bit_Command" is information written to the PLD register by an MCU 505, and after obtaining the MCU information, the PLD register outputs "o_Device_Command" to directly act on an external device 515; the PLD also monitors "w_MCU_bit_Command" from the MCU 505, outputs "w_PLD_bit_Clear_n" after a write-clear logic determination, and performs a clearing operation 510 on the register. A logic module for writing and clearing a register 520 is triggered when a valid transitioning edge happens to "w_MCU_bit_Command"; to ensure that the "o_Device_Command" meets the requirements of the external device 515, a time delay is also required at the end of the clearing by the PLD.

A CPLD/FPGA program is compiled based on the read-clearing design and write-clearing design for the preset bit of the register, and a burned image of the CPLD/FPGA program is updated, which is followed by starting the switch and collecting the input signal, communication signal, register information, and output control signal, to validate the strategy and adjust the delay parameter, thereby optimizing a switch register clearing module.

The MCU needs only to initiate a start operation on the corresponding register, after which either the read-clearing operation or the write-clearing operation is done independently by the PLD. To ensure that MCU obtains reliable data or performs a reliable operation on external devices, a timer is set additionally before clearing. According to the embodiments of the present disclosure, a load on the MCU is reduced without affecting the number of IOs and without incurring a significant increase in logic resources, i.e., without affecting device type selection.

It should be noted that the steps in the embodiments of the above-mentioned method for clearing a register based on a PLD may be interleaved and replaced with each other, and added to or deleted from one another; therefore, such rearrangement and changes of the method for clearing a register based on a PLD shall also fall within the scope of protection of the present disclosure, and the scope of protection of the present disclosure shall not be limited to these embodiments.

A read-clearing register sets a corresponding bit of a corresponding register by detecting a valid transitioning edge of an input signal, detects an effective reading of the corresponding bit of the register through a reading instruction from the MCU, and ensures that the MCU reliably obtains information about the corresponding bit of the register by setting a timer. A write-clearing register determines the operation of the MCU on an external device by detecting a writing instruction from the MCU, and also ensures reliable operation of the MCU to the external device by setting a timer.

In view of the above object, a second aspect of the embodiments of the present disclosure provides a system for clearing a register based on a PLD, including: an initialization module, configured to cause the PLD to set preset bits of a first register and a second register as an invalid state and detect whether a command is received from an MCU; a determination module, configured to parse the command and determine whether a reading event or a writing event is triggered in response to detecting that the command is received from the MCU; a read-clearing module, configured to: in response to the reading event being triggered, set the preset bit of the first register as a valid state, cause the MCU to read data of the preset bit of the first register, and cause the PLD to postpone clearing the preset bit of the first register for a preset time; and a write-clearing module, configured to, in response to the writing event being triggered, set the preset bit of the second register as the valid state, cause the MCU to write data into the preset bit of the second register, cause the PLD to acquire the data and postpone clearing the preset bit of the second register for a second preset time.

In some embodiments, the write-clearing module is configured to cause the PLD to: perform a corresponding operation on an external device according to data of the preset bit of the second register and start a timer, and clear the preset bit of the second register when the timer reaches a preset value of the external device.

In some embodiments, the read-clearing module is configured to: detect whether the MCU starts reading data of the preset bit of the first register; start a timer in response to detecting that the MCU starts reading the data of the preset bit of the first register, and detect whether the MCU has completed reading in response to the timer reaching the preset time; and clear the preset bit of the first register in response to detecting that the MCU has completed reading.

In some embodiments, the read-clearing module is configured to: in response to detecting that the MCU has not completed reading, detect whether the MCU has completed reading again after the preset time elapsed.

In view of the above object, a third aspect of the embodiments of the present disclosure provides a computer device, including: at least one processor and a memory storing computer instructions executable on the processor, the instructions being executed by the processor to perform the steps of: S1, setting, by the PLD, preset bits of a first register and a second register as an invalid state, and detecting whether a command is received from an MCU; S2, parsing the command and determining whether a reading event or a writing event is triggered in response to detecting that the command is received from the MCU; S3, in response to the reading event being triggered, setting the preset bit of the first register as a valid state, reading, by the MCU, data of the preset bit of the first register, and postponing clearing the preset bit of the first register by the PLD for a preset time; and S4, in response to the writing event being triggered, setting the preset bit of a second register to be the valid state, writing, by the MCU, data into the preset bit of the second register, acquiring the data by the PLD and postponing clearing the preset bit of the second register by the PLD for a second preset time.

In some embodiments, acquiring the data by the PLD and postponing clearing the preset bit of the second register by the PLD for a second preset time includes causing the PLD to perform operations of: performing a corresponding operation on an external device according to data of the preset bit of the second register and starting a timer, and clearing the preset bit of the second register when the timer reaches a preset value of the external device.

In some embodiments, postponing clearing the preset bit of the first register by the PLD for a preset time includes: detecting whether the MCU starts reading data of the preset bit of the first register; starting a timer in response to detecting that the MCU starts reading the data of the preset bit of the first register, and detecting whether the MCU has completed reading in response to the timer reaching the preset time; and clearing the preset bit of the first register in response to detecting that the MCU has completed reading.

In some embodiments, postponing clearing the preset bit of the first register by the PLD for a preset time includes: in response to detecting that the MCU has not completed reading, detecting whether the MCU has completed reading again after the preset time elapsed.

Figure 6:
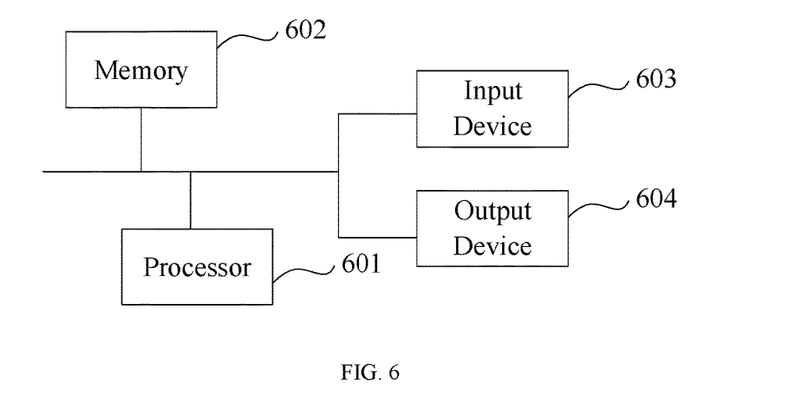
FIG. 6 is a schematic diagram illustrating a hardware structure of an embodiment of a computer device for clearing a register based on a PLD provided by the present disclosure.

FIG. 6 is a schematic diagram illustrating a hardware architecture of an embodiment of a computer device for clearing a register based on a PLD provided by the present disclosure.

Taking the device shown in FIG. 6 as an example, the device includes at least one processor 601 and at least one memory 602, and may further include an input device 603 and an output device 604.

The processor 601, the memory 602, the input device 603, and the output device 604 may be connected via a bus or in other ways, the connection via a bus being exemplified in FIG. 6.

The memory 602 is a non-volatile computer-readable storage medium that may be used to store non-volatile software programs, non-volatile computer-executable programs, and modules, such as program instructions/modules corresponding to the method for clearing a register based on a PLD in the embodiments of the present disclosure. The processor 601 implements various functional applications of the server and data processing by running non-volatile software programs, instructions, and modules stored in the memory 602, that is, to implement the method for clearing a register based on a PLD in the embodiments described above.

The memory 602 may include a program storage partition and a data storage partition, where the program storage partition may store an operating system, an application program required by at least one function, and computer-readable instructions; the data storage partition may store data created according to the use of the method for clearing a register based on a PLD, etc. In addition, the memory 602 may include a high-speed random-access memory and may also include a non-volatile memory, such as at least one magnetic disk storage device, flash memory device, or other non-volatile solid-state storage device. In some embodiments, the memory 602 may optionally include a memory remotely located with respect to the processor 601, which may be connected to a local module via a network. Examples of such a network include, but are not limited to, the Internet, intranets, local area networks, mobile communication networks, and combinations thereof.

The input device 603 may receive input information such as a username and password. The output device 604 may include a display such as a screen.

One or more program instructions/modules corresponding to the method for clearing a register based on a PLD are stored in the memory 602 and, when executed by the processor 601, perform the method for clearing a register based on a PLD in any of the method embodiments described above.

Any embodiment of a computer device implementing the above-described method for clearing a register based on a PLD may achieve the same or similar effects as any of the above-described method embodiments corresponding thereto.

The present disclosure further provides a computer-readable storage medium storing computer-readable instructions that, when executed by a processor, perform the method as described above.

Finally, it should be noted that those skilled in the art can understand that all or part of the processes in the methods of the above embodiments can be implemented by instructing related hardware through computer-readable instructions. The readable instructions of the method for clearing the register based on the PLD can be stored in a computer-readable storage medium, and the readable instructions, when executed, can include the processes of the embodiments of the above-mentioned methods. The storage medium of the readable instructions may be a magnetic disk, an optical disk, a read-only memory (ROM) or a random access memory (RAM). The above embodiments of computer-readable instructions can achieve the same or similar effect as any of the above-mentioned method embodiments.

The above are exemplary embodiments of the present disclosure, but it should be noted that various changes and modifications can be made without departing from the scope of the embodiments of the present disclosure defined in the claims. The functions, steps and/or actions of the method claims in accordance with the disclosed embodiments described herein need not be performed in any particular order. In addition, although the elements disclosed in the embodiments of the present disclosure may be described or claimed in an individual form, they may also be understood as multiple unless explicitly limited to be a singular number.

It should be understood that as used herein, the singular form "a" and "an" are intended to include the plural forms as well, unless the context clearly supports an exception. It should also be understood that "and/or" as used herein is meant to include any and all possible combinations of one or more of the associated listed items.

The serial numbers of the embodiments disclosed in the above-mentioned embodiments are only for description, and do not represent the advantages and disadvantages of the embodiments.

Those skilled in the art can understand that all or part of the steps for implementing the above-mentioned embodiments can be completed by hardware, or by instructing related hardware based on computer-readable instructions. The computer-readable instructions can be stored in a non-volatile computer-readable storage medium, and the storage medium may be a read-only memory, a magnetic disk or an optical disk, and the like.

Those skilled in the art should understand that the discussion of any of the above embodiments is exemplary only, and is not intended to imply that the scope (including claims) of the embodiments of the present disclosure is limited to these examples. Under the idea of the embodiments of the present disclosure, the technical features in the above embodiments or different embodiments can also be combined, and there are many other changes in different aspects of the above embodiments of the present disclosure, which are not provided in details for the sake of brevity. Therefore, within the spirit and principle of the embodiments of the present disclosure, any omissions, modifications, equivalent replacements, improvements, etc., shall be included in the protection scope of the embodiments of the present disclosure.

The invention claimed is:

1. A method for clearing a register based on a programmable logic device (PLD), comprising:
 causing the PLD to set preset bits of a first register and a second register as an invalid state, and detect whether a command is received from a microcontroller unit (MCU);
 in response to detecting that the command is received from the MCU, parsing the command and determining whether a reading event or a writing event is triggered;
 in response to the reading event being triggered, setting the preset bit of the first register as a valid state, reading, by the MCU, data of the preset bit of the first register, and postponing clearing, by the PLD, the preset bit of the first register for a preset time; and
 in response to the writing event being triggered, setting the preset bit of the second register as the valid state, writing, by the MCU, data into the preset bit of the second register, and causing the PLD to acquire the data, and postpone clearing the preset bit of the second register for a second preset time.

2. The method according to claim 1, wherein the causing the PLD to acquire the data, and postpone clearing the preset bit of the second register for a second preset time comprises:
 causing the PLD to: perform a corresponding operation on an external device according to data of the preset bit of the second register and start a timer, and clear the preset bit of the second register when the timer reaches a preset value of the external device.

3. The method according to claim 1, wherein the postponing clearing, by the PLD, the preset bit of the first register for a preset time comprises:
 detecting whether the MCU starts reading data of the preset bit of the first register;
 starting a timer in response to detecting that the MCU starts reading data of the preset bit of the first register, and detecting whether the MCU has completed reading in response to the timer reaching the preset time; and
 clearing the preset bit of the first register in response to detecting that the MCU has completed reading.

4. The method according to claim 3, wherein the postponing clearing, by the PLD, the preset bit of the first register for a preset time comprises:
 detecting, after the preset time elapsed, whether the MCU has completed reading again in response to detecting that the MCU has not completed reading.

5. A computer device, comprising:
 at least one processor; and
 a memory storing computer-readable instructions executable on the processor that, when executed by the at least one processor, cause the at least one processor to perform operations of:
 causing a programmable logic device (PLD) to set preset bits of a first register and a second register as an invalid state, and detect whether a command is received from a microcontroller unit (MCU);
 in response to detecting that the command is received from the MCU, parsing the command and determining whether a reading event or a writing event is triggered;
 in response to the reading event being triggered, setting the preset bit of the first register as a valid state, reading, by the MCU, data of the preset bit of the first register, and postponing clearing, by the PLD, the preset bit of the first register for a preset time; and
 in response to the writing event being triggered, setting the preset bit of the second register as the valid state, writing, by the MCU, data into the preset bit of the second register, and causing the PLD to acquire the data, and postpone clearing the preset bit of the second register for a second preset time.

6. A non-transitory computer-readable storage medium, wherein the non-transient computer-readable storage medium stores computer-readable instructions that, when executed by a processor, cause the processor to perform operations of:
 causing a programmable logic device (PLD) to set preset bits of a first register and a second register as an invalid state, and detect whether a command is received from a microcontroller unit (MCU);

in response to detecting that the command is received from the MCU, parsing the command and determining whether a reading event or a writing event is triggered;

in response to the reading event being triggered, setting the preset bit of the first register as a valid state, reading, by the MCU, data of the preset bit of the first register, and postponing clearing, by the PLD, the preset bit of the first register for a preset time; and in response to the writing event being triggered, setting the preset bit of the second register as the valid state, writing, by the MCU, data into the preset bit of the second register, and causing the PLD to acquire the data, and postpone clearing the preset bit of the second register for a second preset time.

7. The method according to claim 1, wherein the first register is a read-only register for the MCU, and is used for recording a log event.

8. The method according to claim 7, wherein the determining whether a reading event or a writing event is triggered comprises detecting, by the PLD, whether a log event is triggered.

9. The method according to claim 1, wherein the second register is a readable and writable register for the MCU, and is used for resetting an external device.

10. The method according to claim 2, wherein the causing the PLD to acquire the data, and postpone clearing the preset bit of the second register for a second preset time comprises:
causing the PLD to cancel the operation on the external device when the timer reaches the preset value of the external device.

11. The method according to claim 1, wherein the setting the preset bit of the first register as a valid state comprising setting the preset bit of the first register as the valid state when a valid transitioning edge happens to i_Original_NET, wherein i_Original_NET is an original signal input to the PLD.

12. The computer device according to claim 5, wherein the processor is further configured to perform operations of:
causing the PLD to: perform a corresponding operation on an external device according to data of the preset bit of the second register and start a timer, and clear the preset bit of the second register when the timer reaches a preset value of the external device.

13. The computer device according to claim 5, wherein the processor is further configured to perform operations of:
detecting whether the MCU starts reading data of the preset bit of the first register;
starting a timer in response to detecting that the MCU starts reading data of the preset bit of the first register, and detecting whether the MCU has completed reading in response to the timer reaching the preset time; and
clearing the preset bit of the first register in response to detecting that the MCU has completed reading.

14. The computer device according to claim 13, wherein the processor is further configured to perform operations of:
detecting, after the preset time elapsed, whether the MCU has completed reading again in response to detecting that the MCU has not completed reading.

15. The computer device according to claim 5, wherein the first register is a read-only register for the MCU, and is used for recording a log event.

16. The computer device according to claim 15, wherein the determining whether a reading event or a writing event is triggered comprises detecting, by the PLD, whether a log event is triggered.

17. The computer device according to claim 5, wherein the second register is a readable and writable register for the MCU, and is used for resetting an external device.

18. The computer device according to claim 12, wherein the causing the PLD to acquire the data, and postpone clearing the preset bit of the second register for a second preset time comprises:
causing the PLD to cancel the operation on the external device when the timer reaches the preset value of the external device.

19. The computer device according to claim 5, wherein the setting the preset bit of the first register as a valid state comprising setting the preset bit of the first register as the valid state when a valid transitioning edge happens to i_Original_NET, wherein i_Original_NET is an original signal input to the PLD.

20. The non-transitory computer-readable storage medium according to claim 6, wherein the processor is further configured to perform operations of:
causing the PLD to: perform a corresponding operation on an external device according to data of the preset bit of the second register and start a timer, and clear the preset bit of the second register when the timer reaches a preset value of the external device.

* * * * *